US010743575B2

(12) United States Patent
Van Velzen

(10) Patent No.: US 10,743,575 B2
(45) Date of Patent: Aug. 18, 2020

(54) DEVICE FOR EXTRACTING JUICE FROM FRUIT AND/OR VEGETABLE ITEMS

(71) Applicant: Thompe B.V., Purmerend (NL)

(72) Inventor: Tom Van Velzen, Purmerend (NL)

(73) Assignee: Thompe B.V., Purmerend (NL)

(*) Notice: Subject to any disclaimer, the term of this patent is extended or adjusted under 35 U.S.C. 154(b) by 265 days.

(21) Appl. No.: 15/774,940

(22) PCT Filed: Nov. 23, 2016

(86) PCT No.: PCT/EP2016/078502
§ 371 (c)(1),
(2) Date: May 9, 2018

(87) PCT Pub. No.: WO2017/089367
PCT Pub. Date: Jun. 1, 2017

(65) Prior Publication Data
US 2018/0325158 A1  Nov. 15, 2018

(30) Foreign Application Priority Data

Nov. 25, 2015  (NL) ..................................... 2015851

(51) Int. Cl.
*A47J 43/25*  (2006.01)
*A23N 1/02*  (2006.01)

(52) U.S. Cl.
CPC ............. *A23N 1/02* (2013.01); *A47J 43/255* (2013.01)

(58) Field of Classification Search
CPC .... A47J 43/255; A47J 19/027; A47J 37/1257; A47J 19/02; A47J 43/06
USPC ......... 99/331, 337, 348, 353, 403, 510, 511, 99/512, 513; 426/599, 518
See application file for complete search history.

(56) References Cited

U.S. PATENT DOCUMENTS

| 5,743,176 A | 4/1998 | Anderson |
| 8,146,490 B2* | 4/2012 | Obersteiner .......... A47J 19/027 241/273.2 |

FOREIGN PATENT DOCUMENTS

| BE | 540243 | 7/1959 |
| DE | 1244350 | 7/1967 |
| DE | 3529674 | 2/1987 |

* cited by examiner

Primary Examiner — Christopher J Besler
(74) Attorney, Agent, or Firm — Marcus C. Dawes

(57) ABSTRACT

A device for extracting juice from fruit and/or vegetable items, in particular apples (10), wherein a pressing chamber (26) is arranged to be moved relative to said device in a repeating sequence to three different positions (31,32,33), said three positions being: a first position (31) wherein a pulp receiving opening of the pressing chamber (26) is located immediately adjacent a grater unit (16), such that in said position a grating step can take place wherein said pulp is received from the grater unit (16) directly in the pressing chamber (26); a second position (32) wherein the pulp receiving opening is located immediately adjacent a pressing plunger (34) and the pulp ejection opening is located immediately adjacent a pressing sieve (35), such that in said position a pressing step can take place wherein juice is pressed from the pulp through the sieve (35) and into juice collecting means (37); and a third position (33) wherein the pulp ejection opening is in open communication with pulp collecting means (6), such that in said position a pulp ejection step can take place wherein the pulp is removed from the pressing chamber (26) through the ejection opening.

17 Claims, 3 Drawing Sheets

DEVICE FOR EXTRACTING JUICE FROM FRUIT AND/OR VEGETABLE ITEMS

The invention relates to a device for extracting juice from fruit and/or vegetable items, in particular apples. In the preferred embodiment the device comprises: an items container arranged to hold at least one of said items; a grater unit arranged to grate the item into pulp; supply means arranged to supply items from the items container to the grater unit, wherein said grater unit comprises a movable perforated grater plate provided with apertures with sharpened rims arranged to cut the surface of said item, and a movable grating plunger arranged to press said item against said sharpened rims of the grater plate while said grater plate is being moved along the surface of the item, such that said item is being grated; a pressing chamber arranged to receive the pulp and to receive a movable pressing plunger for pressing juice from said pulp through a pressing sieve; and juice collecting means arranged to receive juice being pressed through said pressing sieve; wherein said pressing chamber comprises a circumferential wall and a pulp receiving opening at one outer end and a pulp ejection opening at its other outer end.

Juice extractors are popular in juice bars, supermarkets and the like, because they provide consumers with freshly made juice in a quick and easy manner. In particular juice extractors for oranges and the like which are suitable to be operated by consumers themselves can be seen in many vending locations. A need exists for similar juice extractors for other kinds of fruits or vegetables, such as apples. Because of their structure, apples need a different juice extraction process than oranges. The aim of the invention therefore is to provide a compact, reliable, cost effective, easy to operate and/or effective juice extractor device for fruit and/or vegetable items such as apples.

To that end, according to the invention said pressing chamber is arranged to be moved relative to said device in a repeating sequence to three different positions, said three positions being: a first position wherein the pulp receiving opening is located immediately adjacent the grater unit, such that in said position a grating step can take place wherein said pulp is received from the grater unit directly in the pressing chamber; a second position wherein the pulp receiving opening is located immediately adjacent the pressing plunger and the pulp ejection opening is located immediately adjacent the pressing sieve, such that in said position a pressing step can take place wherein said juice is pressed from the pulp through the sieve and into said juice collecting means; and a third position wherein the pulp ejection opening is in open communication with pulp collecting means, such that in said position a pulp ejection step can take place wherein the pulp is removed from the pressing chamber through the ejection opening.

Preferably in the third position the pulp receiving opening is located immediately adjacent an ejection plunger arranged to eject said pulp through the pulp ejection opening. Preferably said pressing plunger and said ejection plunger are connected to each other, such that they move in a synchronous manner to simultaneously press juice from a pressing chamber located on the second position and eject pulp from a pressing chamber located on the third position.

Preferably said device comprises three substantially identical pressing chambers arranged to be moved in a repeating sequence to said three positions, such that each one of said pressing chambers can occupy one of said positions simultaneously such that simultaneously a grating step, a pressing step and an ejection step can take place at each one of said positions. Preferably said three pressing chambers are mounted in a rotating carousel for achieving said arranged movement to said three positions. Preferably said rotating carrousel is substantially disc shaped.

Preferably the circumferential wall of said pressing chamber(s) is cylindrical. Preferably the cross section of said pressing plunger and/or said ejection plunger matches the shape of said circumferential wall of the pressing chamber(s).

Preferably said movable perforated grater plate is a rotating disc shaped grater plate.

Preferably said plungers are pneumatically or hydraulically driven.

Preferably said juice collecting means comprise a tube for transporting the juice from the sieve to a substantially vertical spout, under which a support for a juice container, such as a bottle or a glass, is present.

Preferably said items container comprises an opening at its lower side having dimensions such a sequence of one item at a time is allowed to pass through. Preferably said items container comprises a moving bottom plate, in particular a rotating bottom plate, for causing said items to move to said opening. Preferably said supply means arranged to supply items from the items container to the grater unit comprise a tube shaped guide having dimensions such a sequence of one item at a time is allowed to pass through.

Preferably said items container is located above the grating unit, the grating unit is located above the pressing chamber, and the pressing chamber is located above the juice collecting means, such that apart form transport effected by said plungers, the transport of items, pulp and juice through the device is substantially entirely caused by gravity.

In the preferred embodiment said device comprises two substantially identical units for extracting juice from fruit and/or vegetable items, each comprising said items container, said grater unit, said supply means arranged to supply items from the items container to the grater unit, said pressing chamber, and said juice collecting means. Preferably said units are mounted in said device in a mirrored manner.

The invention will now be illustrated by means of a preferred embodiment, with reference to the drawings, wherein.

Figure 1:
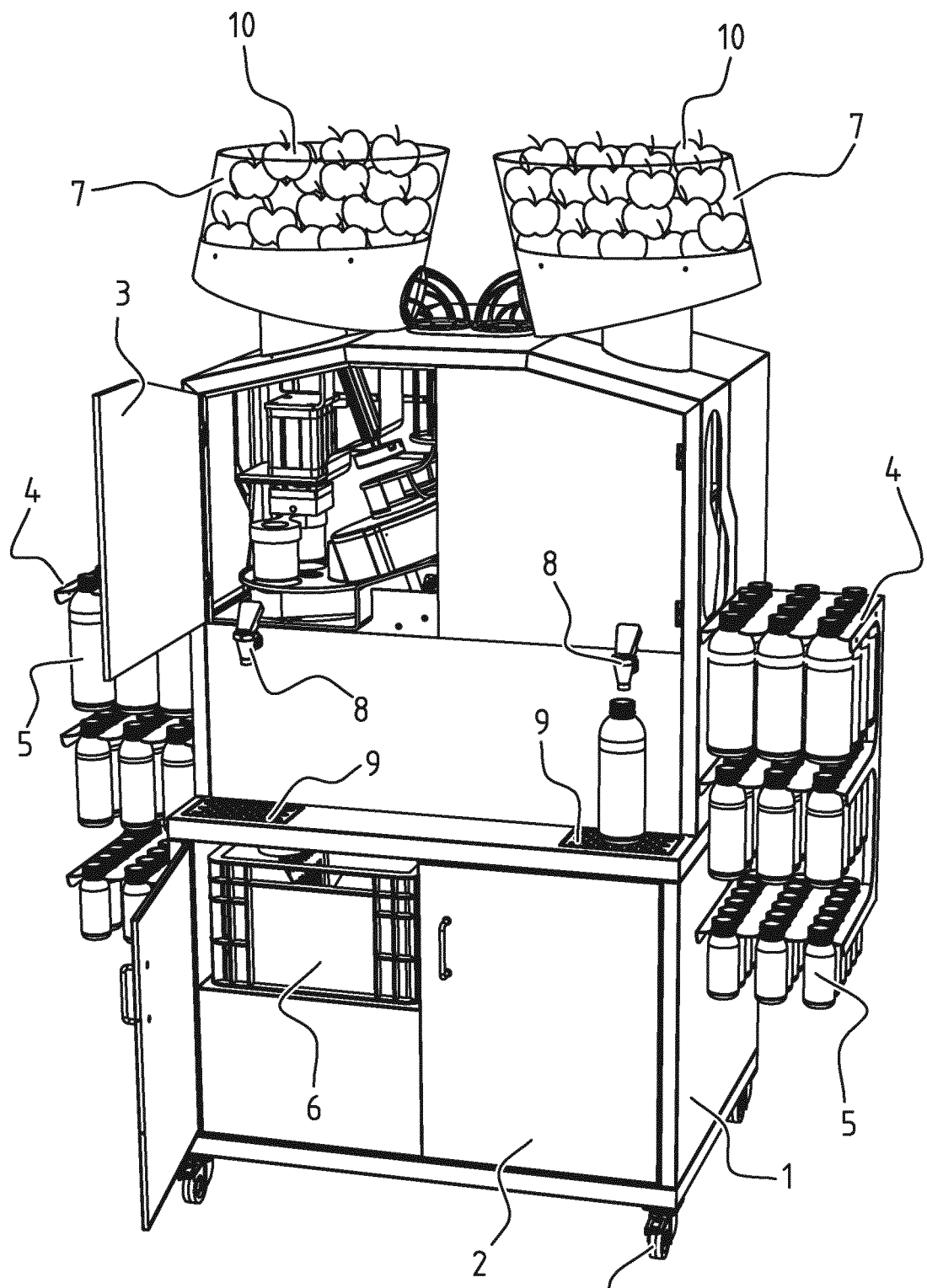
FIG. 1 is a perspective view of a device in accordance with the invention.

As shown in FIG. 1, a device for extracting juice from fruit and/or vegetable items, in particular apples 10, comprises a general housing 1 with doors 2 arranged to access the inner operating parts of the device. The device comprises caster wheels 3 such that it can be easily moved around to a suitable location, for instance inside a food or drinks shop or supermarket. On the outer side of the housing 1 racks 4 for holding empty juice bottles 5 to be filled with juice are mounted.

In the bottom of the housing 1 removable crates 6 are placed, for collecting pulp waste from the grated and pressed items 10. On top of the housing 1 two items containers 7 are mounted, which are open at the top such that they can be easily filled with fresh items 10. Inside the top part of the housing 1 the mechanism for extracting juice from the items 10 is located. On the front side of the device two spouts 8 for releasing juice from the device are present, and under each spout 8 a support 9 for a bottle 4 is provided.

Figure 2:
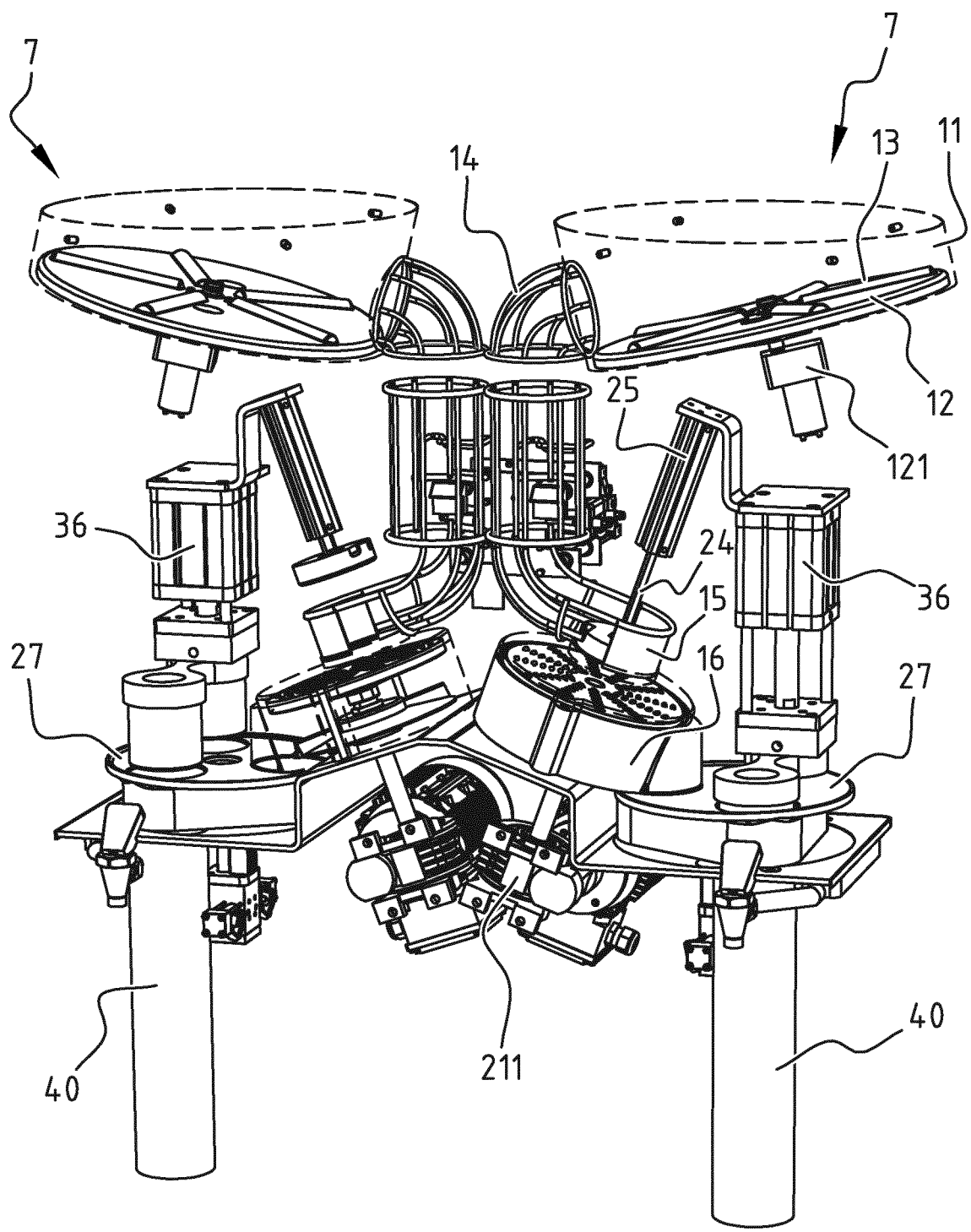
FIG. 2 is a perspective view of an inner part of the device of FIG. 1.
Figure 3:
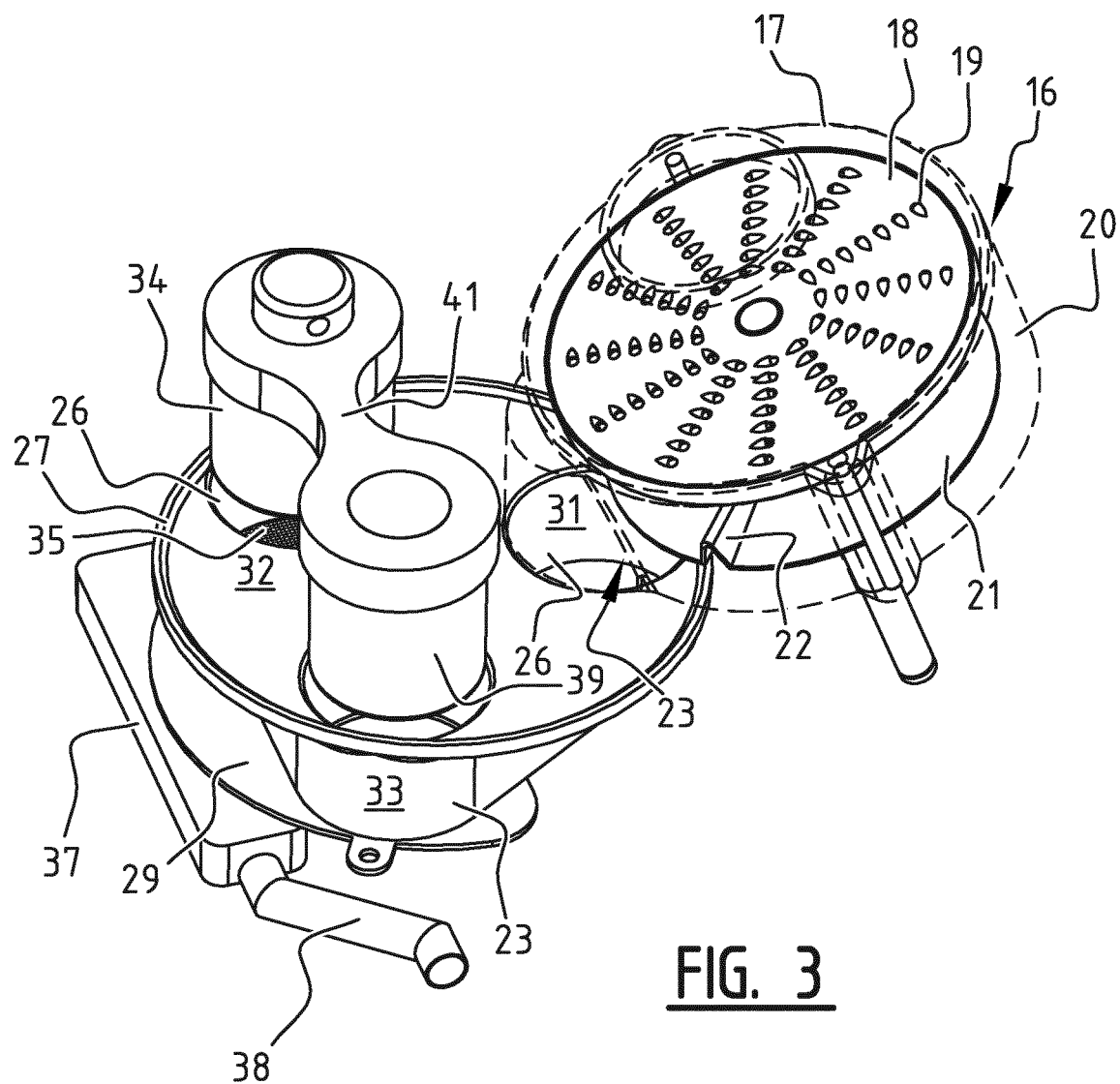
FIG. 3 is a more detailed perspective view of an inner part of the device of FIG. 1.

With reference to FIGS. 2 and 3, the mechanism for extracting juice from the items 10 comprises two identical but mirrored units, extending substantially parallel in vertical direction to each other. Each unit comprises the following features. The items container 7 mounted on top of the housing 1 comprises a substantially cylindrical stationary wall 11 and a circular rotatable bottom plate 12, which is rotated by an electric motor 121. The common central axis of the wall 11 and the bottom plate 12 include a positive angle with the vertical direction, such that when the bottom plate 12 is rotated the items in the container 7 will move to the lowest corner of the container 7. In order to promote movement of the items 10 the bottom plate 12 is provided with radially extending protruding ribs 13. In the wall 11, directly adjacent the lowest corner of the container 7, an aperture is provided having dimensions to allow one item 10 to pass into supply means 14 in the form of a substantially vertical open tubular guide having a diameter to allow said one item to fall down. The bottom outer end of the guide means 14 is bent such that the item will move in a substantially horizontal direction against a semi-circular wall 15 forming a grating position item holder, and which is located on top of a grater unit 16.

The grater unit 16 comprises a housing 17 comprising a substantially cylindrical stationary wall 20, a rotatable grater plate 18 mounted in the top section of the housing 17, and a circular rotatable bottom plate 21 which is rotated by an electric motor 211. The housing 17 has an opening immediately under the grating position item holder 15, for allowing an item 10 to pass through into the housing 17 and onto the rotatable grater plate 18. The grater plate 18 is perforated with apertures provided with sharpened rims 19 on the top side, such that when an item is pressed against the rotating grater plate 18 the item is grated into pulp. A plunger 24, pneumatically driven by a pneumatic actuator 25, is located above the grating position item holder, for pressing an item against the rotating grater plate 18. The common central axis of the wall 20 and the bottom plate 21 include a positive angle with the vertical direction, such that when the bottom plate 21 is rotated the pulp in the housing 17 will move to the lowest corner of the housing 17. In order to promote movement of the pulp the bottom plate 21 is provided with radially extending protruding ribs 22. In the wall 20, directly adjacent the lowest corner of the housing 17, an aperture 23 is provided to allow the pulp to fall down into a pressing chamber 26 located directly under said aperture 23.

A rotatable generally disc shaped carousel 27 is mounted under the grating unit 16. The carousel 27 has three pressing chambers 26 extending along the circular edge of the carousel, and equally spaced form each other. Each pressing chamber is formed by a cylindrical wall, and is open at the top and bottom. Underneath the carousel 27 a stationary bottom plate 29 is mounted which prevents the pulp in the pressing chambers to fall through while said carousel is being rotated, with the exception of the pressing step position and in the ejection step position, as explained below.

In a stationary position of the carousel, wherein one of said pressing chambers 26 extends directly under the aperture 23 of the grating unit 16, the positions of said pressing chambers 26 form three processing step positions: a grating step position 31, a pressing step position 32, and an ejecting step position 33. The carousel 27 is intermittently driven by an electric motor 28 such that said three pressing chambers 26 move in a repeating sequence to said three different processing positions 31, 32, 33. During standstill of said carousel said three processing steps (the item grating step as described above, as well as a juice pressing step and a pulp ejecting step as described below) are simultaneously carried out at said three positions 31, 32, 33.

A mentioned before, in the grating step position the pulp falls into a pressing chamber 26 located directly under the aperture 23. Then after the carousel is rotated 120 degrees such that said pressing chamber 26 is located at the pressing step location 32, a plunger 34 is forced down into the pressing chamber 26, such that juice is pressed out of the pulp through a sieve 35 which is stationary mounted in the bottom plate under the pressing step location 32. The plunger 34 is moved up and down by a pneumatic actuator 36. The juice which is pressed through the sieve 35 is collected in a reservoir 37, and from there downwardly transported to spout 8 through a tube 38.

Then after the carousel 27 is rotated a further 120 degrees such that said pressing chamber 26 is located at the ejecting location 33, a plunger 39 is forced down into pressing chamber 26, such that the remaining item pulp is ejected through an aperture in the stationary bottom plate 29 located under the ejecting location 33, and falls into a removable crate 6 through a pulp exhaust 40. The plunger 39 is rigidly connected to plunger 34 by a connector 41, such that it is moved in a synchronous manner therewith.

The intermittent movements of the described motors and actuators are adapted to each other and controlled by any suitable controller (not shown), such that simultaneous grating, pressing and ejecting takes place at the three processing locations 31, 32, 33.

The invention has thus been described by means of a preferred embodiment. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein.

The invention claimed is:

1. A device for extracting juice from fruit and/or vegetable items comprising:
   an items container arranged to hold at least one of said items;
   a grater unit arranged to grate the items into pulp;
   supply means arranged to supply items from the items container to the grater unit, wherein said grater unit comprises a movable perforated grater plate provided with apertures with sharpened rims arranged to cut the surface of said item, and a movable grating plunger arranged to press said item against said sharpened rims of the grater plate while said grater plate is being moved along a surface of the item, such that said item is being grated;
   a pressing chamber arranged to receive the pulp and to receive a movable pressing plunger for pressing juice from said pulp through a pressing sieve; and
   juice collecting means arranged to receive juice being pressed through said pressing sieve, wherein said pressing chamber comprises a circumferential wall and a pulp receiving opening at one outer end and a pulp ejection opening at its other outer end, said pressing chamber being arranged to be moved relative to said device in a repeating sequence to three different positions, said three positions being:
- a first position wherein the pulp receiving opening is located immediately adjacent the grater unit, such that in said position a grating step can take place wherein said pulp is received from the grater unit directly in the pressing chamber;
- a second position wherein the pulp receiving opening is located immediately adjacent the pressing plunger and the pulp ejection opening is located immediately adjacent the pressing sieve, such that in said position a pressing step can take place wherein said juice is pressed from the pulp through the sieve and into said juice collecting means; and
- a third position wherein the pulp ejection opening is in open communication with a container configured to collect pulp, such that in said position a pulp ejection step can take place wherein the pulp is removed from the pressing chamber through the ejection opening.

2. Device in accordance with claim 1, wherein in the third position the pulp receiving opening is located immediately adjacent an ejection plunger arranged to eject said pulp through the pulp ejection opening.

3. Device in accordance with claim 2, wherein said pressing plunger and said ejection plunger are connected to each other, such that they move in a synchronous manner to simultaneously press juice from a pressing chamber located on the second position and eject pulp from a pressing chamber located on the third position.

4. Device in accordance with claim 1, wherein said device comprises three substantially identical pressing chambers arranged to be moved in a repeating sequence to said three positions, such that each one of said pressing chambers can occupy one of said positions simultaneously such that simultaneously the grating step, the pressing step and the ejection step can take place at each one of said positions.

5. Device in accordance with claim 4, wherein said three pressing chambers are mounted in a rotating carousel for achieving said arranged movement to said three positions.

6. Device in accordance with claim 5, wherein said rotating carrousel is substantially disc shaped.

7. Device in accordance with claim 1, wherein the circumferential wall of said pressing chamber is cylindrical.

8. Device in accordance with claim 1, wherein the cross section of said pressing plunger and/or said ejection plunger matches the shape of said circumferential wall of the pressing chamber.

9. Device in accordance with claim 1, wherein said movable grater plate is a rotating disc shaped grater plate.

10. Device in accordance with claim 1, wherein said plungers are pneumatically or hydraulically driven.

11. Device in accordance with claim 1, wherein said juice collecting means comprise a tube for transporting the juice from the sieve to a vertical spout, under which a support for a juice container, such as a bottle or a glass, is present.

12. Device in accordance with claim 1, wherein said items container comprises an opening at its lower side having dimensions such a sequence of one item at a time is allowed to pass through.

13. Device in accordance with claim 12, wherein said items container comprises a moving bottom plate, in particular a rotating bottom plate, for causing said items to move to said opening.

14. Device in accordance with claim 1, wherein said supply means arranged to supply items from the items container to the grater unit comprise a tube shaped guide having dimensions such a sequence of one item at a time is allowed to pass through.

15. Device in accordance with claim 1, wherein said items container is located above the grating unit, the grating unit is located above the pressing chamber, and the pressing chamber is located above the juice collecting means, such that apart form transport effected by said plungers, the transport of items, pulp and juice through the device is caused by gravity.

16. Device in accordance with claim 1, wherein said device comprises two identical units for extracting juice from fruit and/or vegetable items, each comprising said items container, said grater unit, said supply means arranged to supply items from the items container to the grater unit, said pressing chamber, and said juice collecting means.

17. Device in accordance with claim 16, wherein said two identical units are mounted in said device in a mirrored manner.

* * * * *